(12) United States Patent
Betz et al.

(10) Patent No.: US 7,188,522 B2
(45) Date of Patent: Mar. 13, 2007

(54) METHOD FOR ALIGNING A ROTATION RATE SENSOR

(75) Inventors: Uwe Betz, Burg Gräfenrode (DE); Georg Krettler, Egelsbach (DE); Heinz-Werner Morell, Kaiserslautern (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/562,957

(22) PCT Filed: Jun. 3, 2004

(86) PCT No.: PCT/EP2004/051005

§ 371 (c)(1),
(2), (4) Date: Dec. 30, 2005

(87) PCT Pub. No.: WO2005/003684

PCT Pub. Date: Jan. 13, 2005

(65) Prior Publication Data

US 2006/0174684 A1    Aug. 10, 2006

(30) Foreign Application Priority Data

Jul. 4, 2003  (DE) ................. 103 30 399

(51) Int. Cl.
*G01P 3/00* (2006.01)
*G01P 21/00* (2006.01)

(52) U.S. Cl. .................... 73/504.12; 73/1.37
(58) Field of Classification Search ............. 73/1.37, 73/1.38, 1.77, 504.04, 504.12; 702/56
See application file for complete search history.

(56) References Cited

U.S. PATENT DOCUMENTS 6,675,630 B2 * 1/2004 Challoner et al. ........... 73/1.77
6,698,271 B1 * 3/2004 Fell et al. .................... 73/1.37

FOREIGN PATENT DOCUMENTS

| EP | 0 307 231 | 3/1989 |
| EP | 0 642 216 | 3/1995 |
| WO | WO 96/04525 | 2/1996 |
| WO | WO 03/014669 | 2/2003 |

* cited by examiner

*Primary Examiner*—Helen Kwok
(74) *Attorney, Agent, or Firm*—Cohen Pontani Lieberman & Pavane LLP

(57) ABSTRACT

The invention relates to a method for aligning a rotation rate sensor with a vibration gyroscope, the first input and the first output of which is part of a primary control circuit. Said control circuit excites the vibration gyroscope to vibrate at its natural frequency by supplying it with an excitation signal. The second input and the second output of the vibration gyroscope is part of a secondary control circuit. An output signal can be gathered from the second output and said signal is demodulated after amplification and analog to digital conversion to give an in-phase component and a quadrature component. After filtering, these components are modulated and composed to give a driver signal that is supplied to the second input and a rotation rate signal is derived from the in-phase component. The inventive method is characterized in that, when the vibration gyroscope remains motionless, correction values are added to the in-phase components and to the quadrature component which correction values are changed until the in-phase component and the quadrature component reach a minimum each. The correction values are stored in a non-volatile memory and are used when the rotation rate sensor is operated.

2 Claims, 2 Drawing Sheets

METHOD FOR ALIGNING A ROTATION RATE SENSOR

CROSS REFERENCE TO RELATED APPLICATIONS

This is a U.S. national stage of application No. PCT/EP2004/051005, filed on 3 Jun. 2004. Priority is claimed on the following application(s): Country: Germany, Application No.: 103 30 399.5, Filed: 4 Jul. 2003.

BACKGROUND OF THE INVENTION

The invention relates to a method for adjustment of a rotation rate sensor having a vibration gyro, which, with a first input and a first output, is part of a primary control loop which excites the vibration gyro by supplying an excitation signal to the first input at its natural frequency, in which case the vibration gyro, with a second input and with a second output, is also part of a secondary control loop, in which case an output signal can be tapped off from the second output and, after amplification and analog/digital conversion, is demodulated to form an in-phase component and a quadrature component, in which case the components are modulated again after filtering and are combined to form a driver signal which is supplied to the second input, and in which case a rotation rate signal is derived from the in-phase component.

In the case of rotation rate sensors having a vibration gyro, which are operated with the measures mentioned in the introduction being carried out, not only is the variation in the output signal caused by the Coriolis force included in the rotation rate signal, but also an inadvertent phase shift which is caused by delay times in the components which form the at least one control loop.

SUMMARY OF THE INVENTION

An object of the present invention is to minimize the influences of the inadvertent phase shift on the rotation rate signal of a rotation rate sensor caused by delay times in the components of at least one control loop of the rotation rate sensor.

According to the invention, this object is achieved in that, when the vibration gyro is not moving, correction values are added to the in-phase components and to the quadrature components and are varied until the in-phase component and the quadrature component are each at a minimum, and in that these correction values are stored in a non-volatile memory and are used during operation of the rotation rate sensor.

The method according to the invention is preferably carried out within a final adjustment process during the production of the rotation rate sensor. The non-volatile memory is in this case used for even further correction and initialization variables, and therefore does not need to be provided just for the method according to the invention.

BRIEF DESCRIPTION OF THE DRAWINGS

The invention allows numerous embodiments. One of these will be described in the following text and is illustrated schematically in a plurality of figures in the drawing, in which.

DETAILED DESCRIPTION OF THE PREFERRED EMBODIMENTS

The exemplary embodiment as well as parts of it are admittedly shown in the form of block diagrams. However, this does not mean that the arrangement according to the invention is restricted to an implementation using individual circuits corresponding to the blocks. In fact, the arrangement according to the invention can be implemented particularly advantageously using large-scale-integrated circuits. In this case, microprocessors may be used which, when suitably programmed, carry out the processing steps illustrated in the block diagrams.

Figure 1:
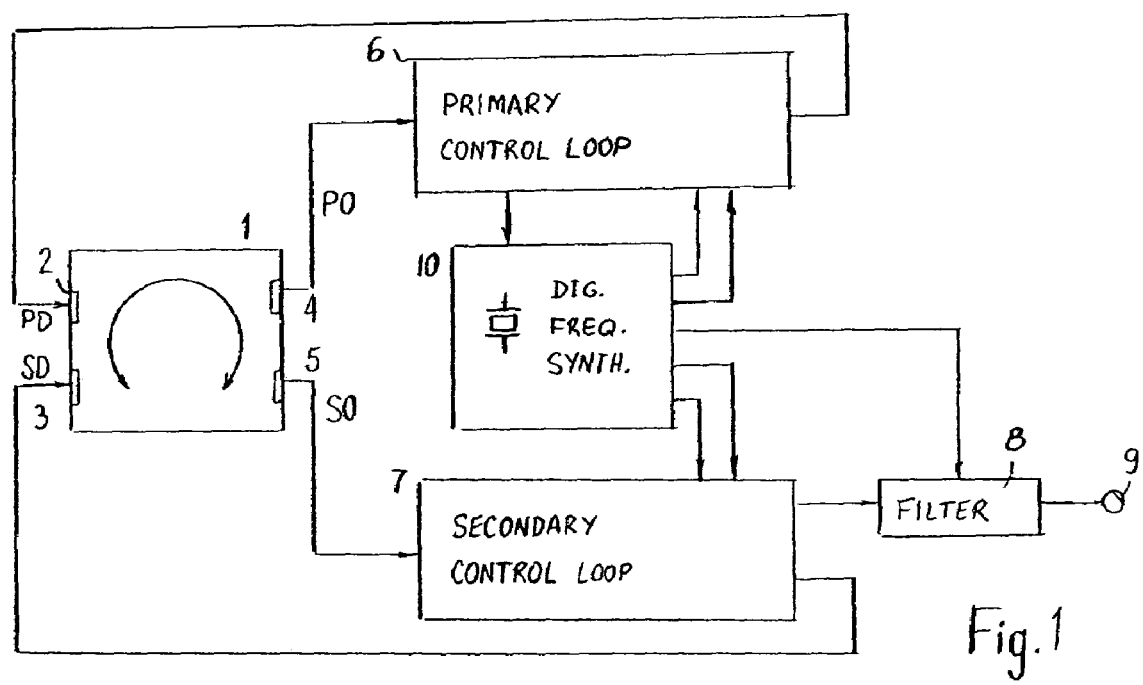
FIG. 1 is a block diagram of a rotation rate sensor.

FIG. 1 shows a block diagram of an arrangement having a vibration gyro 1 with two inputs 2, 3 for a primary excitation signal PD and a secondary excitation signal SD. The excitation is provided by means of suitable transducers or converters, for example electromagnetic transducers. The vibration gyro furthermore has two outputs 4, 5 for a primary output signal PO and a secondary output signal SO. These signals reproduce the respective vibration at physically different points in the gyro. Gyros such as these are known, for example, from EP 0 307 321 A1 and are based on the Coriolis force effect.

The vibration gyro 1 represents a high Q-factor filter, in which the path between the input 2 and the output 4 is part of a primary control loop 6, and the path between the input 3 and the output 5 is part of a secondary control loop 7. The primary control loop 6 is used to stimulate oscillations at the resonant frequency of the vibration gyro at, for example, 14 kHz. The stimulation is in this case applied on one axis of the vibration gyro with respect to which the oscillation direction that is used for the secondary control loop is offset through 90°. The signal SO is split in the secondary control loop 7 into two quadrature components, one of which is passed via a filter 8 to an output 9, from which a signal which is proportional to the rotation rate can be tapped off.

A major proportion of the signal processing is carried out digitally in both control loops 6, 7. The clock signals which are required for signal processing are produced in a crystal-controlled digital frequency synthesizer 10, whose clock frequency in the illustrated example is 14.5 MHz. The primary control loop will not be described, since this is not necessary for understanding of the exemplary embodiment.

Figure 2:
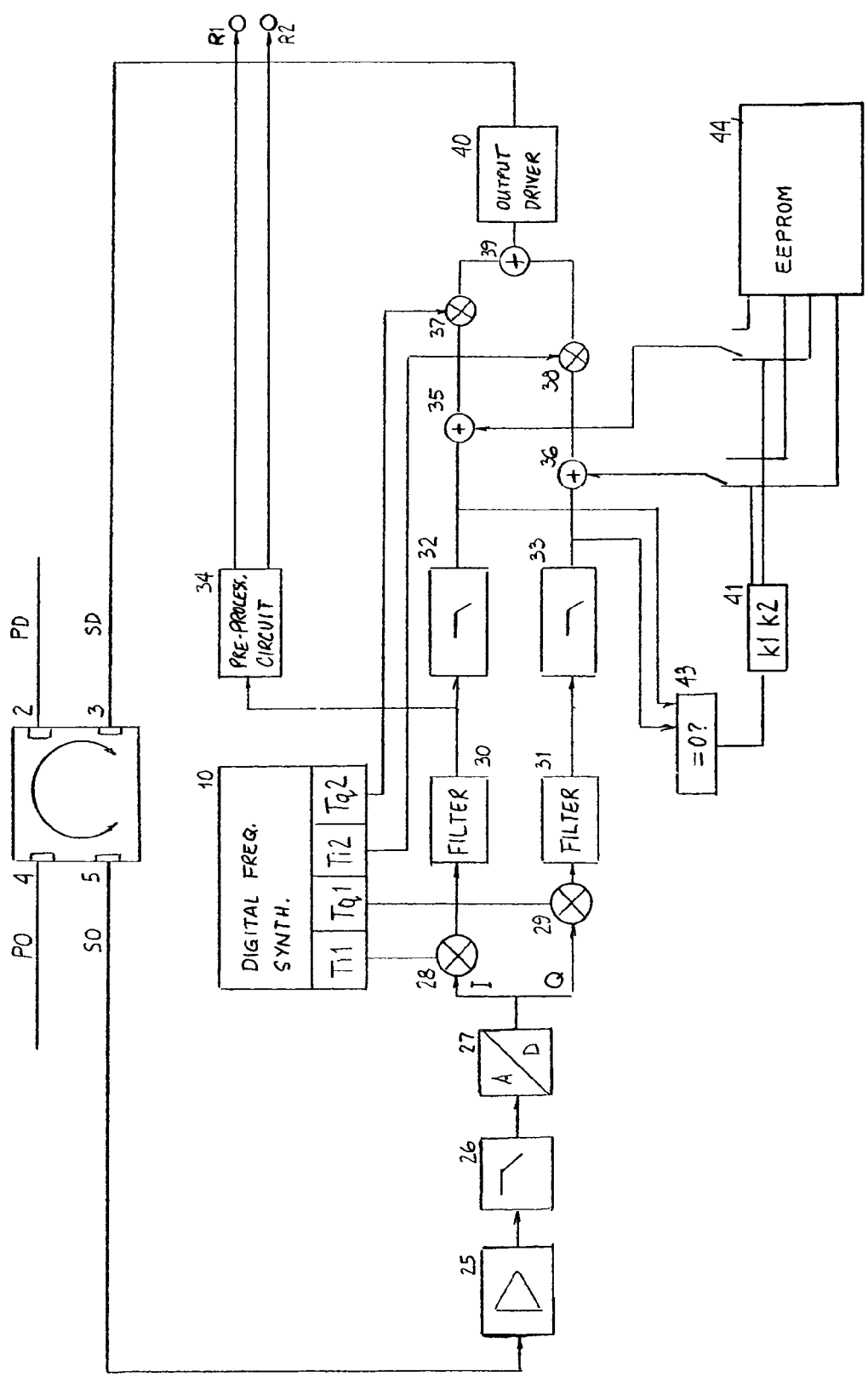
FIG. 2 is a more detailed illustration of a secondary control loop in the rotation rate sensor.

The secondary control loop 7 is illustrated in the form of a block diagram in FIG. 2 and contains an amplifier 25, an anti-aliasing filter 26 and an analog/digital converter 27. Splitting into the real part and the imaginary part is carried out with the aid of multipliers 28, 29, to which the amplified and digitized signal SO is supplied, with the I and Q components, which have not yet been separated, and the carriers Ti1 and Tq1.

The two components then each pass through a (sinx/x) filter 30, 31 and a low-pass filter 32, 33, respectively. Two signals R1 and R2, which represent the rotation rate to be measured by the rotation rate sensor, are derived by means of a preprocessing circuit 34 from the filtered real part. The signals R1 and R2 differ in that the signal R2 does not occupy the entire amplitude range for example from 0V to +5V that is possible with the circuit technology that is used. The signal R2 is set to zero in order to output a fault message, which the connected system identifies as a fault message.

The low-pass filters 32, 33 are followed by a respective adder 35, 36. The two components Si and Sq, respectively, are then remodulated with the carriers Ti2 and Tq2, by means of multipliers 37, 38. An addition process at 39 once again results in a 14 kHz oscillation, which is converted in an output driver 40 to a current which is suitable for stimulation of the vibration gyro 1.

The frequency synthesizer 10 is controlled in a manner that is not illustrated in any more detail in order to carry out the modulation process at 28 with a phase angle i and the demodulation process at 29 with a phase angle q. This means that an in-phase component I is demodulated at 28, and a quadrature component Q is demodulated at 29.

However, the in-phase components and the quadrature components are corrupted by variations in the delay times in the various circuits involved. The measurement result, that is to say the rotation rate signal, is therefore corrupted.

In order to avoid this, an adjustment process is carried out in which correction variables k1 and k2, which are produced in a device 41, are added to the filtered components by means of the adders 35, 36, with the correction values k1 and k2 being chosen such that they result in a phase shift in the excitation signal SD and thus also in the output signal SO. The changeover switches 42 are then in the illustrated position. During the adjustment process, the predetermined value ranges of the correction values k1, k2 are passed through. At the same time, a check is carried out in a device 43 to determine whether the in-phase component and the quadrature component are each zero or have assumed a minimum. If this is the case, the correction values k1, k2 which are produced in the device 41 are then stored in an EEPROM 44. During normal operation, the changeover switches 42 are in the right-hand position and the correction values as determined during the adjustment process are read from the EEPROM 44 and are supplied to the adders 35, 36.

What is claimed is:

1. A method for adjustment of a rotation rate sensor having a vibration gyro, a first input and a first output of the vibration gyro being part of a primary control loop which excites the vibration gyro by supplying an excitation signal to the first input at a natural frequency of the vibration gyro, a second input and a second output of the vibration gyro being part of a secondary control loop, said method comprising the steps of:

tapping an output signal from the second output, and demodulating the tapped output signal, after amplification and analog/digital conversion, to form an in-phase component and a quadrature component;

modulating the in-phase and quadrature components, after filtering, and combining the modulated in-phase and quadrature components to form a driver signal;

supplying the driver signal to the second input;

deriving a rotation rate signal from the in-phase component;

adding correction values to the in-phase component and the quadrature component when the vibration gyro is not moving;

varying the correction values and performing the step of adding with the varied correction values until the in-phase component and the quadrature component are each at a minimum value; and after said step of varying, storing the correction values which generate the minimum value of the in-phase and quadrature components in a non-volatile memory and using the stored correction values during operation of the rotation rate sensor.

2. The method of claim 1, wherein said step of using the stored correction values comprises retrieving the stored correction values from the non-volatile memory and adding the stored correction values to the in-phase and quadrature components during operation of the rotation rate sensor.

* * * * *